US007609262B2

(12) United States Patent
Olhofer et al.

(10) Patent No.: US 7,609,262 B2
(45) Date of Patent: Oct. 27, 2009

(54) EVOLUTIONARY OPTIMIZATION AND FREE FORM DEFORMATION

(75) Inventors: Markus Olhofer, Selingenstadt (DE); Stefan Menzel, Dreieich (DE); Bernhard Sendhoff, Bruchköbel (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 62 days.

(21) Appl. No.: 11/302,686

(22) Filed: Dec. 13, 2005

(65) Prior Publication Data

US 2006/0187219 A1    Aug. 24, 2006

(30) Foreign Application Priority Data

Dec. 27, 2004  (EP)  .................................. 04030832
Sep. 27, 2005  (EP)  .................................. 05021063

(51) Int. Cl.
*G06T 17/00*   (2006.01)
*G06F 17/50*   (2006.01)

(52) U.S. Cl. ........................................... 345/420; 703/1
(58) Field of Classification Search ....................... None
See application file for complete search history.

(56) References Cited

U.S. PATENT DOCUMENTS 5,719,794 A * 2/1998 Altshuler et al. ............... 703/1
2004/0199365 A1 * 10/2004 Washizawa .................... 703/1
2005/0143962 A1 * 6/2005 Keane et al. ................... 703/1

OTHER PUBLICATIONS

Ernest C. Perry, Steven E. Benzley, Mark Landon and Richard Johnson, "Shape Optimization of Fluid Flow Systems," 2000, Proceedings of ASME Fluids Engineering Summer Conference.*
Markus Olhofer, Yaochu Jin, Dernhard Sendhoff, "Adaptive Encoding for Aerodynamic Shape Optimization using Evolution Strategies," 2001, Proceedings of the 2001 Congress on Evolutionary Computation, vol. 1, p. 576-583.*
Thomas W. Sederberg, Jianmin Zheng, Almaz Bakenov, Ahmad Nasri, T-Splines and T-NURCCs, Jul. 2003, ACM Transactions on Graphics (TOG), vol. 22, No. 3, 477-484.*

(Continued)

*Primary Examiner*—Ulka Chauhan
*Assistant Examiner*—Jason M Repko
(74) *Attorney, Agent, or Firm*—Fenwick & West LLP

(57) ABSTRACT

Techniques are provided for representation of designs using a basic design which is then modified by a transformation function. In free form deformation techniques the transformation function is defined by a spline function which transforms the space in which the design is defined into a second space where the new modified design is defined. During the design process the parameters of the spline function determine the parameters of the transformation function. While using Evolution Strategies, parameters of the spline function also determine the parameters the optimization algorithm works in. In order to adapt the transformation function optimally to the given problem and the necessary modification a mutation operator is proposed which allows introduction and deletion of control points. Instead of the standard mutation operator in evolution strategies this mutation operator works on the representation of the problem/design.

8 Claims, 6 Drawing Sheets

OTHER PUBLICATIONS

Desideri, J-A. et al., "Multilevel Shape Parameterization for Aerodynamic Optimization—Application to Drag and Noise Reduction of Transonic/Supersonic Business Jet," European Congress on Computational Methods in Applied Sciences and Engineering ECCOMAS 2004, Jul. 24-28, 2004, pp. 1-14.

European Search Report, EP 05021063, Apr. 18, 2006, 10 pages.

Janka, A. et al., "Hierarchical Parameterization for Multilevel Evolutionary Shape Optimization with Application to Aerodynamics," Presented at EUROGEN 2003, Evolutionary Methods for Design, Optimization and Control with Applications to Industrial Problems, Sep. 19, 2003, pp. 1-18.

Menzel, S. et al., "Application of Free Form Deformation Techniques in Evolutionary Design Optimisation," 6th World Congress on Structural and Multidisciplinary Optimization, May 30-Jun. 3, 2005, pp. 1-10.

Olhofer, M. et al., "Adaptive Encoding for Aerodynamic Shape Optimization Using Evolution Strategies," IEEE, 2001, pp. 576-583.

Sederberg, T.W. et al., "T-splines and T-NURCCs," ACM, 2003, pp. 477-484.

* cited by examiner

EVOLUTIONARY OPTIMIZATION AND FREE FORM DEFORMATION

CROSS-REFERENCE TO RELATED APPLICATIONS

This application is related to and claims priority from European Patent Applications No. 04 030 832.2 filed on Dec. 27, 2004 and 05 021 063.2 filed on Sep. 27, 2005, which are all incorporated by reference herein in their entirety.

FIELD OF THE INVENTION

The underlying invention generally relates to the fields of evolutionary optimization and free form deformation.

BACKGROUND OF THE INVENTION

In order to apply optimization algorithms to design optimization problems it is essential to find ways to describe the shape of a design by a set of parameters which can be modified by the optimization algorithm. A well known method is for example to define a spline line for two dimensional surfaces or a spline surface for three dimensional designs, which describe the surface of the object which is to be optimized. In this case the parameters which are modified by the optimization algorithms are the control and knot points, and in the case of NURBS (non rational B-splines) additionally the weights of the control points. Another way of representing a given design is to define a transformation function which transforms the space in which a basic design is given. In this case a variation of a shape can be realized by modifying parameter of a transformation function. These methods can be summarized under the term of free form deformation.

Constrained Deformation

The principle of constrained deformation was formulated by Borrel and Bechman. P. Borrel and D. Bechmann, Deformation of n-dimensional objects, *International Journal of Computational Geometry Applications*, 1(4):427-453, 1991, which is incorporated by reference herein in its entirety. They developed a general deformation scheme in which the deformation is defined by an arbitrary number of user-specified point displacement constraints. The deformation method from Borrel and Bechmann, which is illustrated in FIG. 1, is based on the following principle: the original and deformed spaces $R^n$ are two projections of a higher dimensional space $R^m$. The deformation is thus defined by the composition of a function $f:R^n \to R^m$ that transforms the points of the original space $R^n$ into points of $R^m$ with a projection T from $R^m$ back onto $R^n$. The projection matrix is computed so as to achieve given displacements (called constraints) of given points (called constraint points) of the original space.

Mathematically stated, the deformation function d, which expresses the transformation on any point of $R^n$, is expressed as the composition of a function $f:R^n \to R^m$ (m>n) with a linear transformation $T:R^m \to R^n$. If $U \in R^n$ and M the corresponding matrix of T, we have:

$$d(U) = Mf(U) \qquad (1)$$

The choice of $f$ and the intermediate dimension m defines a set of possible deformations as can be seen from FIG. 1.

Different functions $f$ produce different types of deformation, global or local for example. The concrete deformation depends only on the matrix M. The corresponding transformation T selects an "appropriate" deformation from the set of potential ones. The greater m in contrast to n the larger the range of possible deformations.

Generally, this model encapsulates a large family of possible deformations: for example, linear space transformations are obtained if $f$ is linear, or FFD are obtained if $f$ is a tensor product Bernstein polynomial and if M is built with displacement vectors of control points.

Once $f$ and m are specified the choice of an appropriate M and consequently the transformation of arbitrary points $U \in R^n$ is carried out in three steps with the help of the $n_c$ constraint points $V_i$:

1. Select the desired displacement of the $n_c$ constraint points $V_i$, $i \in [1, n_c]$. These points essentially establish the degrees of freedom for a design optimization.

2. The projection matrix M is obtained by solving n systems of $n_c$ equations, each with m unknowns constituting one row of M. This system in turn is derived from the $n \times n_c$ equations:

$$d(V_i) = Mf(V_i) \forall i \in [1, n_c] \qquad (2)$$

Unfortunately, this system of equations is not uniquely solvable in any case, which constitutes the main drawback of the technique described here. Three situations may be distinguished:

a) If m is greater than $n_c$ and all $f(V_i)$ vectors are linearly independent there exists an infinity of solutions. Choosing one M by the user fixes the deformation. Several ways to do so were discussed by Borrel and Bechmann.

b) If m=$n_c$ only one solution M exists.

c) Otherwise no deformation can be found satisfying the constraints. In this case a best approximate solution is used.

3. The displacement of any point U is computed by $d(U) = Mf(U)$.

Due to the fact that the re-transformations M only depends on the constraint points $V_i$, the deformation of an initial object U (set of points $U_j$ can be carried out very efficiently. The values $f(U_j)$ need to be computed only once and can then be used for several deformations defined by several sets of constraints. Consequently, design optimization requires the re-computation of the values of $f(V_i)$ only for the constraints added, deleted or changed, and not for the object points $U_j$.

As already pointed out, the selection process of M is technically demanding and requires user interaction. Additionally, the shape of the deformation is not strongly correlated with the constraints, which makes the technique non-intuitive. In order to circumvent these deficits, Borrel and Rappoport simplified the general constraint deformation concept, now termed Simplified Constraint Deformation short Scodef. P. Borrel and A. Rappoport, Simple Constrained Deformations for Geometric Modeling and Interactive Design, *ACM Transactions on Graphics*, 13(2):137-155, Apr. 1994, which is incorporated by reference herein in its entirety. The central idea of the Scodef approach is the unification of the re-transformation M and therefore the simplification of the whole process. This is achieved by the choice of $f$ as a tensor product of B-spline basis functions each centered at a constraint point where each point influences the deformation process. Additionally, for each of the $n_c$ constraint points a radius is introduced which affects the scope of each B-spline, i.e., each basis function falls to zero beyond the radius of the corresponding constraint point. Thus the different radii may be used for a fine-tuning of the deformation process. Consequently, a Scodef deformation can be viewed as the deformation obtained by creating an arbitrary number of possible overlapping B-spline-shaped "bumps" over the space. The location and height of a bump is defined by a constraint and its width by the constraint's radius of influence.

Although it is not clear from the literature whether any type of shape may be represented with the constraint deformation approach (completeness requirement), the use of B-splines gives strong evidence that this technique can represent complex curves efficiently and accurately, as B-splines do.

For design optimization using ESs the constraints and/or the displacements of the constraints constitute the free parameters which may be modified with the help of ES-standard genetic operators. In the case of the simple constraint deformation, the radii associated with the $n_c$ constraint points $V_i$ may be used as additional design parameters. As a result from that, three groups of design parameters are available which make the technique very flexible in the number of design parameters. In the best case only four constraint points are necessary for the deformation of a 3D object. Additionally, due to the underlying system of $n_c$ equations, triples of constraint points, their displacements and radii can easily be added or deleted without influencing other design parameters. Of course, such an adaptation process can change the structure of the transformation matrix M and therefore the resulting design. This is in contrast to e.g., B-splines or NURBS where curve of surface preserving addition operators exist which in contrast force the recalculation of control points.

Free Form Deformation

Although developed earlier, the Free Form Deformation (FFD) approach illustrated in FIG. 2 is a special case of the constraint deformation approach described above. T. W. Sederberg and S. R. Parry, Free-Form Deformation of Solid Geometric Models, *Computer Graphics*, 20(4):151-160, Aug. 1986, which is incorporated by reference herein in its entirety. This is true if the transformation function $f$ is a tensor product of Bernstein polynomials (or B-spline basis functions in the case of the simplified constraint deformation) and if M is built with displacement vectors of control points. Like constraint deformation, FFD focuses on the formulation of a more general interactive shape editing concept. In T. W. Sederberg and S. R. Parry, Free-Form Deformation of Solid Geometric Models, *Computer Graphics*, 20(4):151-160, Aug. 1986, which is incorporated by reference herein in its entirety, the authors considered the precise specification of modifications of curves or surfaces built with Bézier, B-splines and NURBS as too laborious in most situations. Even a perceptually simple change may require adjustment of many control points. S. Gibson and B. Mirtich, A Survey of Deformable Modeling in Computer Graphics, Tech. Report No. TR-97-19, Mitsubishi Electric Research Lab., Cambridge, Nov. 1997, which is incorporated by reference herein in its entirety.

Sederberg and Parry generalized approach on regular deformations (i.e. mappings $R^3$ to $R^2$) of solids by embedding an object in a lattice of grid points of some standard geometry such as a cube or cylinder. A. H. Bar, Global and Local Deformation of Solid Primitives, *Computer Graphics*, 18(3):21-30, 1984, which is incorporated by reference herein in its entirety. Manipulating nodes of the grid induces deformations on the space inside the grid with the help of trivariate tensor product Bernstein polynomial. These deformations transform the underlying graphics primitives that form the object. Sederberg and Parry gave a good physical analogy for FFD. Consider a parallelepiped of clear, flexible plastic in which is embedded an object, or several objects, which we wish to deform. The object is imagined to also be flexible, so that it deforms along with the plastic that surrounds it. T. W. Sederberg and S. R. Parry, Free-Form Deformation of Solid Geometric Models, *Computer Graphics*, 20(4):151-160, Aug. 1986 which is incorporated by reference herein in its entirety.

As already pointed out, the first step of the FFD is the fixation of the local coordinate system S, T, U of the enclosing parallelepiped region. With the help of some basic linear algebra, each point X in the parallelepiped may be expressed in the new coordinate system such that $$X = X_o + sS + tT + uU \tag{3}$$

Since the idea of FFD is that the deformation of the enclosing volume induces deformations on the space inside the volume, the next step is the formulation of a grid of control points $P_{ijk}$ on the parallelepiped. The l grid points in S direction, m points in T direction, and n points in U direction allow for the formulation of the deformed enclosing volume with the help of trivariate tensor product Bernstein polynomials whose control points are the grid points. The deformation of the control points which essentially build the free parameters for a potential design optimization is simply specified by moving the $P_{ijk}$ from their undisplaced lattice positions. The deformed position $X_{ffd}$ of an arbitrary point X is found by first computing its (s, t, u) coordinates in the local coordinate system and then evaluating the vector valued trivariate Bernstein polynomial:

$$X_{ffd} = \sum_{i=0}^{l} \binom{l}{i}(1-s)^{l-i}s^i \tag{4}$$

$$\left\{ \left( \sum_{j=0}^{m} \binom{m}{j}(1-t)^{m-j}t^j \left\{ \sum_{k=0}^{n} \binom{k}{n}(1-u)^{k-n}u^k P_{ijk} \right\} \right) \right\}$$

where $X_{ffd}$ is a vector containing the Cartesian coordinates of the displaced point, and where each $P_{ijk}$ is a vector containing the Cartesian coordinates of the control points. In contrast to most other design representation techniques, the primary motivation of the (simple) constraint deformation approach is not an intuitive design tool for shape designers. Instead, a shape modification tool which is independent of the underlying geometric representation is of primary interest.

Extended Free Form Deformation (EFFD)

To improve the basic free form deformation concepts which have been introduced by Sederberg et al. with respect to a higher degree of flexibility, Coquillart developed a method called Extended Free Form Deformation. A. H. Bar, Global and Local Deformation of Solid Primitives, *Computer Graphics*, 18(3):21-30, 1984 which is incorporated by reference herein in its entirety. This method allows the use of arbitrary control volumes in contrast to the restrictive requirement of parallelepiped volumes of control points in standard free form deformation. Because of this change the procedure of deforming an object had to be adapted and the mathematical foundation switched to B-splines. It mainly falls into three steps which are described briefly as follows.

At first a lattice of control points has to be constructed which encloses either the whole object or a part of the object which is targeted for being modified. In a second step the geometry coordinates have to be transferred into the parameter space of the lattice which is also called "freezing". By freezing an object the u, v and w coordinates of the geometry in spline parameter space are calculated. This is usually done by Newton approximation which promises to be the fastest approach but it can also be done by similar gradient based methods or even by evolutionary optimization. After the u, v and w coordinates have been calculated successfully the deformations can be applied by moving the control points to the desired positions and updating the x, y and z coordinates of the surface or solid. Therefore the B-spline equations have to be solved using the new spatial coordinates of the control points. This method is also valid if the geometry model equals a solid or is defined by parametric or implicit equations.

SUMMARY OF THE INVENTION

According to one embodiment of the present invention, techniques are provided for representation of designs using a basic design which is then modified by a transformation function. In free form deformation techniques the transformation function is defined by a spline function which transforms the space in which the design is defined into a second space where the new modified design is defined. During the design process the parameters of the spline function determine the parameters of the transformation function. While using Evolution Strategies, parameters of the spline function also determine the parameters the optimization algorithm works in. In order to adapt the transformation function optimally to the given problem and the necessary modification a mutation operator is proposed which allows introduction and deletion of control points. Instead of the standard mutation operator in evolution strategies this mutation operator works on the representation of the problem/design.

Given the constraints introduced by the use of the underlying splines description, introduction of one single parameter can make the introduction of many more points necessary. According to one embodiment of the present invention, a solution to this problem is provided for the representation of spline surfaces and called T-Spline. A hyper dimensional extension of this special spline type can be used as a transformation function. The parameter of this special transformation function can than be used within the framework of Evolutionary Computation and can be adapted to the needs of actual optimization by means of a new mutation operator working directly on the representation.

According to one embodiment of the present invention, improved optimization techniques are provided using free form deformation as representation. Techniques are provided for Evolutionary Computation using Free Form Deformation as Representation. One embodiment of the present invention provides for a combination of Free Form Deformation and Evolutionary Computation. In another embodiment, in Free Form Deformation the deformation is adapted to the problem. In a further embodiment of the present invention, T-splines are used in combination with evolutionary computation as a transformation function for Free Form Deformations.

DETAILED DESCRIPTION OF THE PREFERRED EMBODIMENTS

Figure 1:
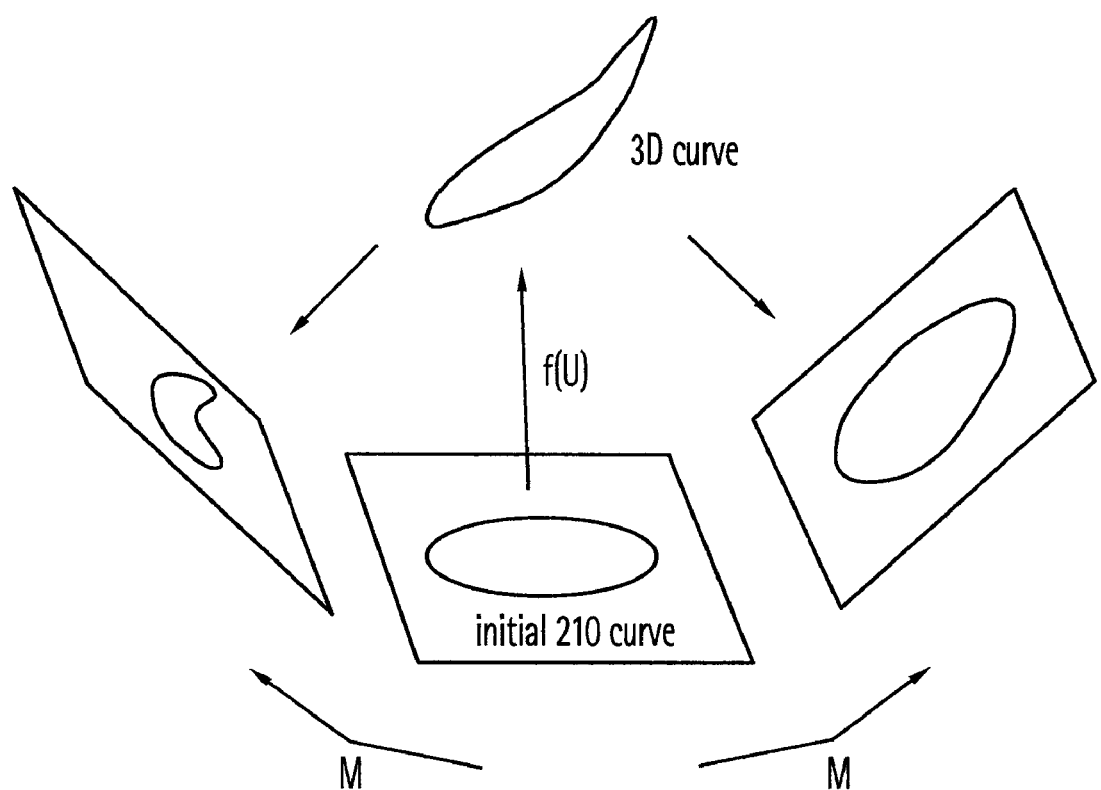
FIG. 1 shows the principle of constraint deformation, illustrating a 3D curve computed from the original 2D curve, and projected twice to obtain two different deformed 2D curve.
Figure 2:
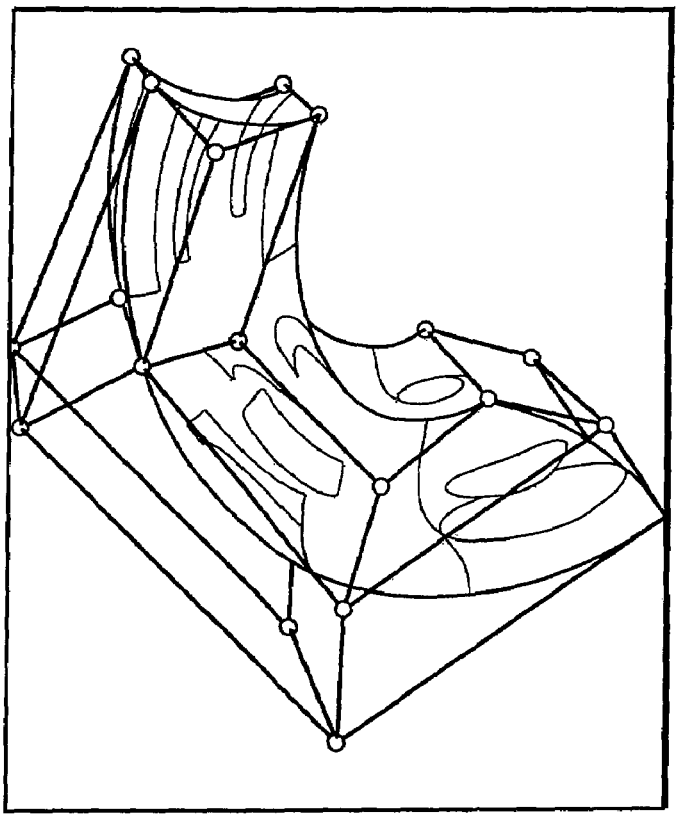
FIG. 2 shows the principle of Free Form Deformation.
Figure 2:
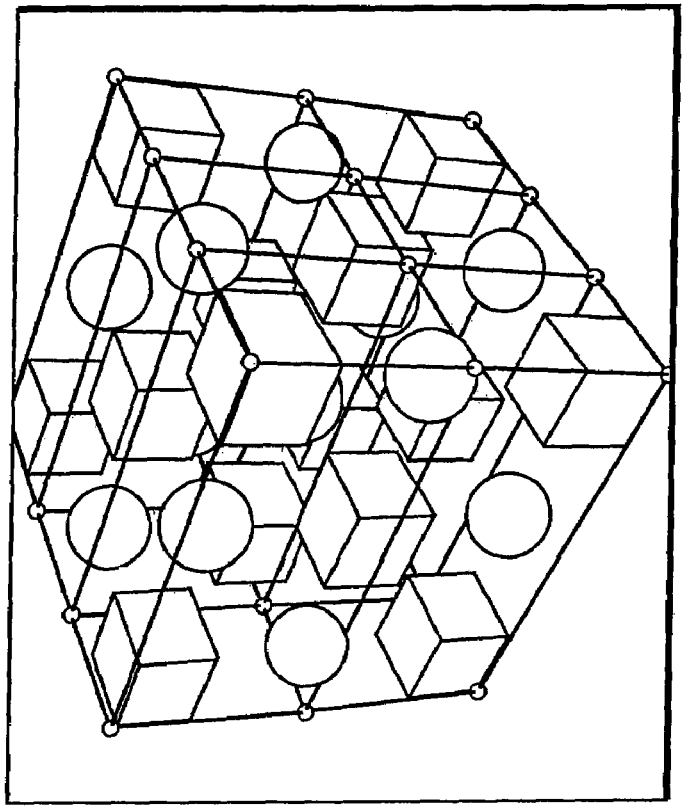
Figures 3A, 3B:
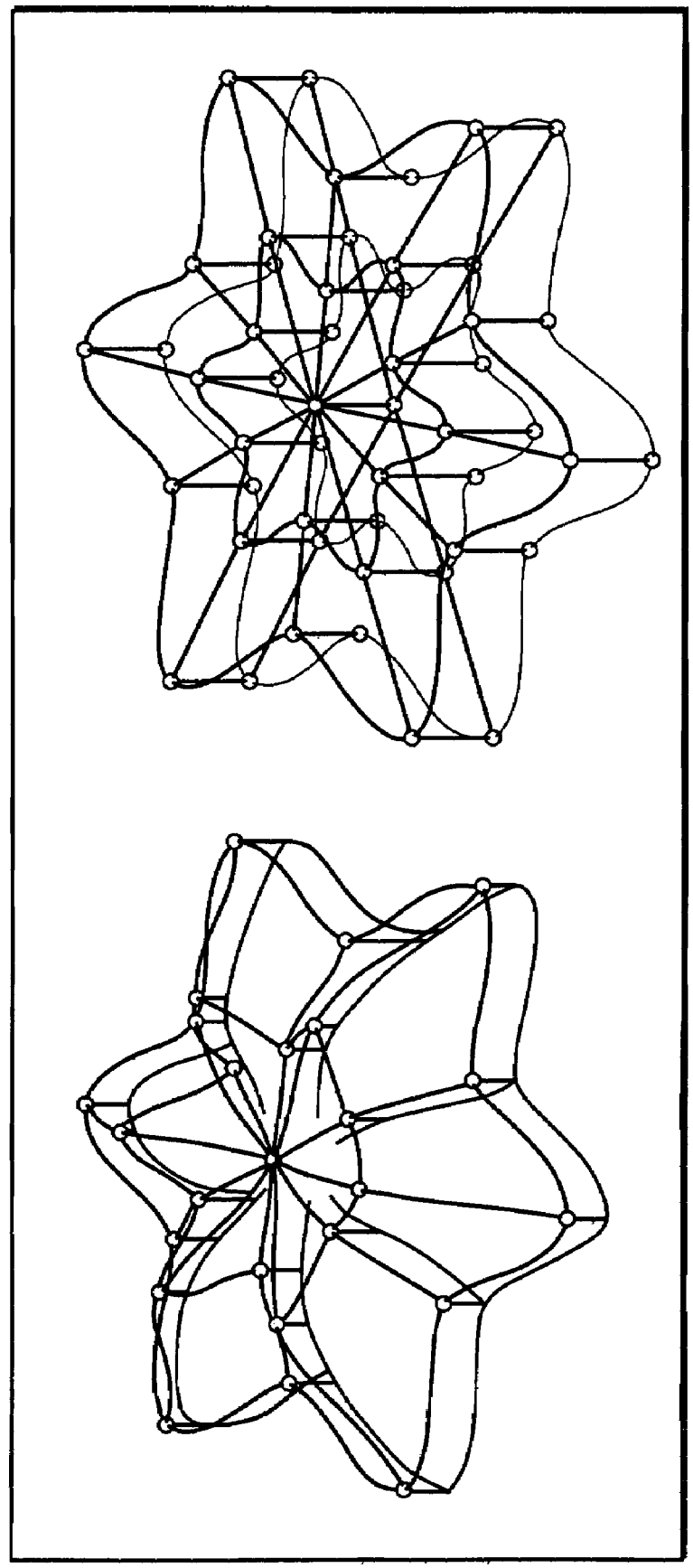
FIG. 3A shows the principle of EFFD, illustrating undisplaced control points of an arbitrary control volume, according to one embodiment of the present invention.
FIG. 3B shows the principle of EFFD, illustrating modified control points of an arbitrary control volume, according to one embodiment of the present invention.

One embodiment of the present invention provides techniques for optimizing a design using free form deformation by determining a transformation function for free form deformation and modifying the design using the transformation function. The transformation function can be defined by a spline function that transforms a space in which the design is defined into a space in which the modified design is defined, wherein a parameter of the spline function determines a parameter of the transformation function. Further, the free form deformation can be used as a representation for evolutionary computation.

Another embodiment of the present invention provides for free form deformation techniques in combination with evolutionary computations with an adaptation of a transformation that is used in the free form deformations. The evolutionary computations can comprise evolution strategies or genetic algorithms.

A further embodiment of the present invention provides free form deformation techniques using T-Splines as transformation in combination with evolutionary computations for parameter adaptation. Additional techniques provide for an online adaptation of the T-Spline structure by point insertion and deletion. The evolutionary computations can comprise evolution strategies or genetic algorithms.

(Extended) Free Form Deformation in Evolutionary Computation

According to one embodiment of the present invention, in terms of evolutionary optimization the application of free form deformation techniques features a lot of advantages, especially if the geometric definition of the shape which has to be optimized is rather complicated and/or if costly Computational Fluid Dynamics (CFD) or Finite Element Methods (FEM) calculations respectively have to be performed. Integrating free form deformations the parameters which are targeted for being optimized are not defined by the shape geometry itself but by the control points of the lattice(s). As a consequence the designer is free to choose the degree of global or local shape changes.

According to one embodiment, before the optimization loop can start the initial shape should be embedded in the lattice(s) and the geometry should be frozen to obtain the u, v and w-coordinates in parameter space. These coordinates play the major role in the genotype-phenotype mapping before the design evaluation step in the evolutionary optimization. Based on the control points as parameters the mutation can be applied and the systems can be prepared for fitness evaluation. According to one embodiment, the new designs are calculated via B-spline or Nurbs equations based on the frozen u, v, w-coordinates coupled with the new control points. Afterwards the designs can be evaluated and the fitness values are assigned to each individual. Finally the new parameters can be selected and the parents for the following generation are determined according to the chosen evolutionary algorithms.

The Effect of (Extended) Free Form Deformation Coupled with CFD or FEM Evaluation To understand the enormous advantage of free form deformation in combination with CFD or FEM according to one embodiment of the present invention, one has to consider that modification of the position of a control point has a strong influence on a certain spatial region of the lattice. This whole volume which size is defined by e.g. the type of spline, spline degree, number of control points, knot vectors etc. is deformed, i.e. not only the shape design which is found inside this volume but also all its surroundings. As a consequence concerning CFD calculations every grid point positioned in this volume is deformed too. So for complicated shapes, according to one embodiment, the computational costly mesh generation process can be omitted because the grid is directly adapted to the deformed shape when the free form deformation is applied. Secondly, in terms of CFD it is also possible to use prior results which had been already converged to a solution instead of repeating a whole, time consuming CFD calculation.

Parameter Adaptiveness of (Extended) Free Form Deformation

This extension of the Free Form Deformation is a particularly advantageous aspect of one embodiment of the present invention. In any kind of optimization a high degree of flexibility of the applied representation is advantageous. The designer tries to find an adequate trade-off between search space and parameter minimization. On the one hand as many as possible designs should be represented and on the other hand a low number of parameters should be used to speed up the optimization process. A good alternative to flexibility is offered by representations which are adaptive. As a consequence, in the beginning of the optimization only a few parameters have to be optimized and in the course of convergence the number of parameters can be increased.

According to one embodiment of the present invention, free form deformations offer the possibility to extend the knot vectors by adding further control points without changing the actual shape in the design process. This fact is very important in an evolutionary design optimization. One can start the optimization with only quite a low number of parameters and, whenever needed, new control points can be added to extend the influence on the shape without losing the actual best design. However, whenever new control points have to be inserted, a whole new row or column of control points need to be inserted into the control point grid if two-dimensional or a plain of control points need to be inserted into the control point grid if three-dimensional. Therefore, unfortunately it is not possible to insert only one control point where it is directly needed for geometrical reasons and many superfluous points have to be taken into account. According to one embodiment of the present invention, this effect is minimized using the concept of T-Splines explained below. T-Splines are a special kind of point-based B-splines allowing the insertion of only partial rows or columns of control points into the control mesh.

T-Splines

Figure 4:
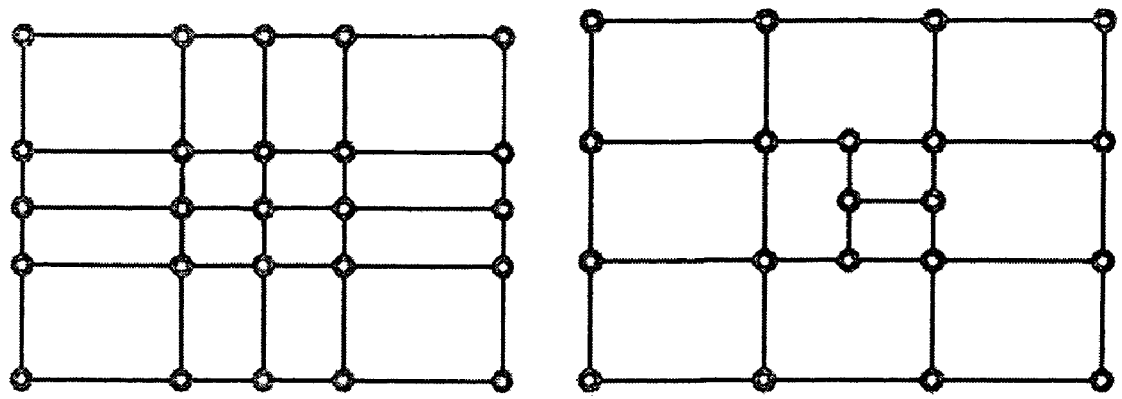
FIG. 4 shows a B-spline-mesh and a T-mesh, according to one embodiment of the present invention.

The concepts of T-splines have been introduced by Sederberg et al. to achieve more flexibility in the process of graphical designing. A. H. Bar, Global and Local Deformation of Solid Primitives, *Computer Graphics,* 18(3):21-30, 1984 which is incorporated by reference herein in its entirety; T. W. Sederberg, J. Zheng, A. Bakenov and A. Nasri, T-splines and T-NURCCs, *ACM Transactions on Graphics,* 22(3):477-484, Jul. 2003, which is incorporated by reference herein in its entirety. T-splines are a generalization of non-uniform B-splines surfaces offering an immense benefit in terms of specifying the arrangement of control points in the underlying mesh. In contrast to a B-spline surface which requires a rectangular grid of control points defined in each cross of a horizontal and vertical line, the lines in a T-mesh need not start and end on the edges of the grid but they can terminate in a T-junction, as shown in FIG. 4. As a consequence the total number of control points is reduced drastically. This fact becomes even more important if one or more additional control points have to be inserted to allow a more flexible and efficient surface design. In a B-spline surface a complete new column and/or row of control points have to be provided whereas in a T-mesh in most cases only a low number of new points need to be added.

For the procedure of knot insertion Sederberg et al. have developed a local refinement algorithm which will be explained later on in more details and, secondly, a concept for removing superfluous control points which is called "T-spline Simplification". According to one embodiment, by application of the removal algorithms it is possible to reduce the total number of control points which would be needed if the designed shape is defined via B-splines.

Figure 5:
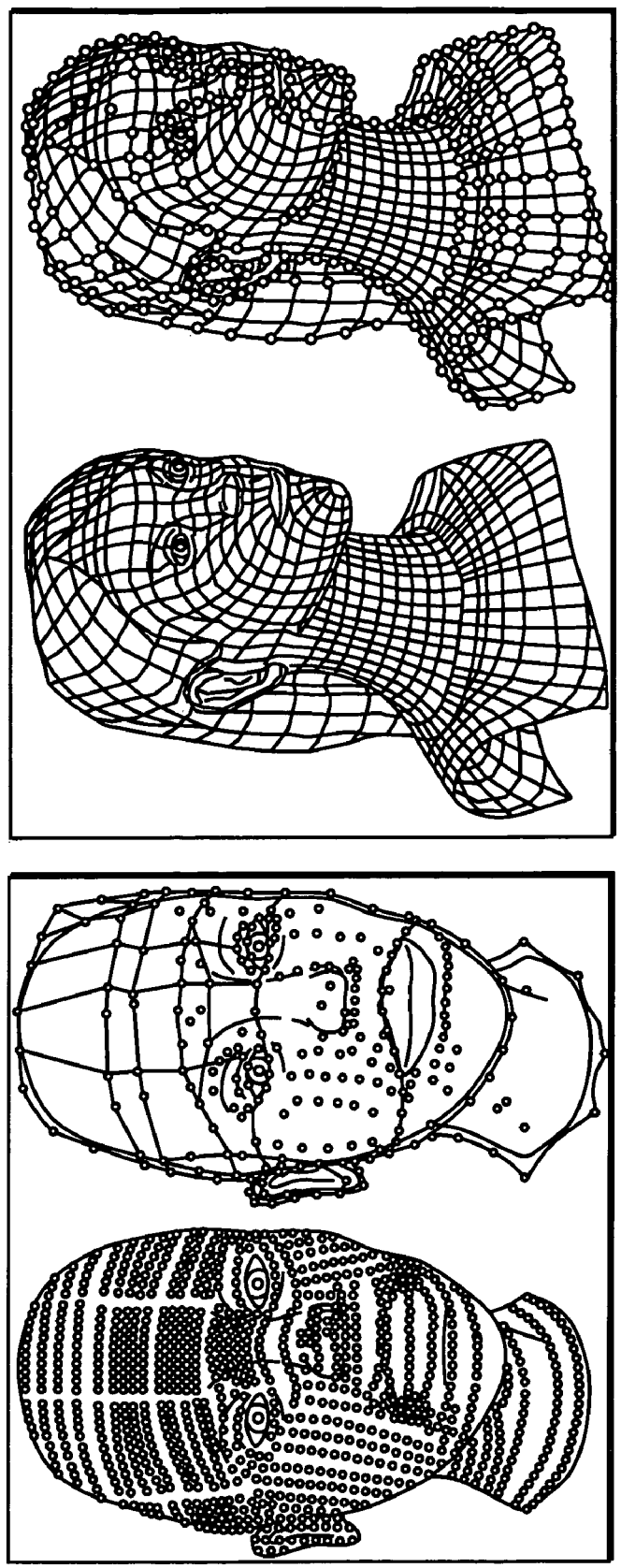
FIG. 5 shows examples for T-spline simplification, according to one embodiment of the present invention.

FIG. 5 illustrates the effect of transforming a NURBS model into T-splines. The total number of control points of the modeled head is reduced from 4712 to 1109 for the male and from 10305 to 3955 for the female. As a consequence the designer obtains a more efficient control on the models and movements of the position of single control points have a close influences on the shape. Furthermore the concepts of T-splines are not only valid for surface modeling in two-dimensional but they can be easily extended to other dimensions and to T-NURCCs (Non-Uniform Rational Catmull-Clark Surfaces) which is the arbitrary-topology version of T-splines. A. H. Bar, Global and Local Deformation of Solid Primitives, *Computer Graphics,* 18(3):21-30, 1984 which is incorporated by reference herein in its entirety; T. W. Sederberg, D. L. Cardon, G. T. Finnigan, N. S. North, J. Zheng and T. Lyche, T-spline Simplification and Local Refinement, *ACM Transactions on Graphics,* 23(3):276-283, Aug. 2004 which is incorporated by reference herein in its entirety; T. W. Sederberg, J. Zheng, A. Bakenov and A. Nasri, T-splines and T-NURCCs, *ACM Transactions on Graphics,* 22(3):477-484, Jul. 2003, which are all incorporated by reference herein in their entirety.

Mathematical Definition and Rules for T-Splines

A T-spline can be deduced from the so-called point-based B-splines (PB-splines), which are introduced by Sederberg et al. T. W. Sederberg, J. Zheng, A. Bakenov and A. Nasri, T-splines and T-NURCCs, *ACM Transactions on Graphics,* 22(3):477-484, Jul. 2003, which is incorporated by reference herein in its entirety. PB-splines are defined by a set of control points and in two-dimensional a pair of knot vectors for each control point. According to one embodiment, to calculate the resulting surface points the following equation is solved:

$$P(s,t) = \frac{\sum_{i=1}^{n} P_i B_i(s,t)}{\sum_{i=1}^{n} w_i B_i(s,t)} \quad (5)$$

$B_i(s,t)$ are the blending functions that are defined by $$B_i(s,t) = N[s_{i0}, s_{i1}, s_{i2}, s_{i3}, s_{i4}](s) N[t_{i0}, t_{i1}, t_{i2}, t_{i3}, t_{i4}](t) \quad (6)$$

$N[s_{i0}, s_{i1}, s_{i2}, s_{i3}, s_{i4}](s)$ and $N[t_{i0}, t_{i1}, t_{i2}, t_{i3}, t_{i4}](t)$ respectively are the cubic B-spline basis functions which are given in general form by:

$$N_{i,0}(u) = \begin{cases} 1 & \text{if } u_i \leq u \leq u_{i+1} \\ 0 & \text{otherwise} \end{cases} \quad (7)$$

$$N_{i,p}(u) = \frac{u - u_i}{u_{i+p} - u_i} N_{i,p-1}(u) + \frac{u_{i+p+1} - u}{u_{i+p+1} - u_{i+1}} N_{i+1,p-1}(u). \quad (8)$$

The $u_i$ are the knots in the knot vector and p defines the degree of the spline. For a calculation of $B_i$ the basis function equations are evaluated using the short knot vectors $$s_i = [s_{i0}, s_{i1}, s_{i2}, s_{i3}, s_{i4}] \text{ and} \quad (9)$$

$$t_i = [t_{i0}, t_{i1}, t_{i2}, t_{i3}, t_{i4}] \quad (10)$$

respectively which are directly connected to the control point $P_i$. The weights $w_i$ can be chosen freely. If all $w_i$ are equal to 1.0 the PB-spline equation simplifies to:

$$P(s,t) = \frac{\sum_{i=1}^{n} P_i B_i(s,t)}{\sum_{i=1}^{n} B_i(s,t)}. \quad (11)$$

Figure 6A:
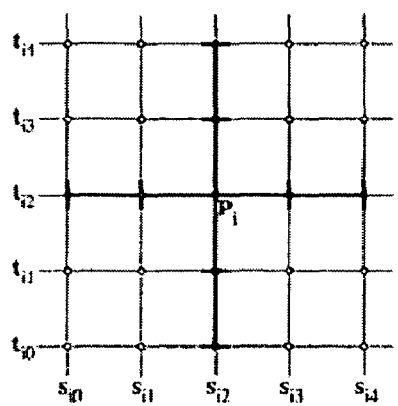
FIG. 6A shows knot lines for a blending function, according to one embodiment of the present invention.
Figure 6B:
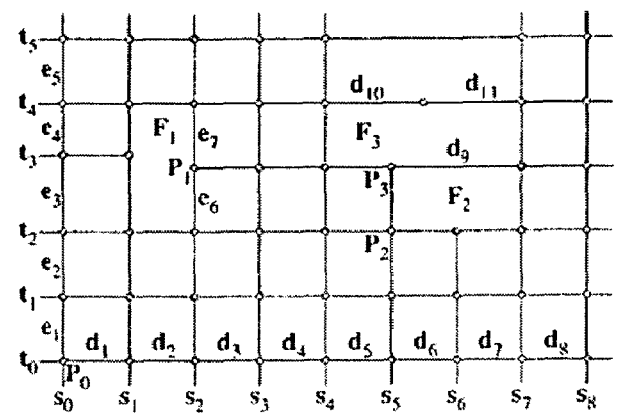
FIG. 6B shows a T-mesh, according to one embodiment of the present invention.

In contrast to a general defined PB-spline a T-spline is structured by a so-called T-mesh which defines some order to the positions of control points. An example of a T-mesh according to one embodiment of the present invention can be found in FIG. 6.

This mesh is important for the definition of the knot vectors which are closely connected to the control point $P_i$. Some requirements have been formalized which a T-mesh should fulfill:

1. The sum of all knot intervals along one side of any face should equal the sum of the knot intervals on the opposing side. A knot interval equals the difference between two knots, for e.g. $d_i$ and $e_i$ in FIG. 6.

2. Two T-junctions have to be connected if and only if after connecting the new faces have equal sums of knot vectors on each opposing side. T. W. Sederberg, D. L. Cardon, G. T. Finnigan, N. S. North, J. Zheng and T. Lyche, T-spline Simplification and Local Refinement, *ACM Transactions on Graphics,* 23(3):276-283, Aug. 2004 which is incorporated by reference herein in its entirety.

The definition of the knot vectors $s_i$ and $t_i$ is based on knot intervals and quite different from the one which would be needed for calculating a B-spline surface. It is stated as Rule 1 in T. W. Sederberg, D. L. Cardon, G. T. Finnigan, N. S. North, J. Zheng and T. Lyche, T-spline Simplification and Local Refinement, *ACM Transactions on Graphics,* 23(3):276-283, Aug. 2004, which is incorporated by reference herein in its entirety: "Consider a ray in parameter space $R(\square) = (s_{i2} + \square, t_2)$. Then $S_{i3}$ and $S_{i4}$ are the s coordinates of the first two s-edges intersected by the ray . . . . By s-edge we mean a vertical line segment of constant s. The other knots in $s_i$ and $t_i$ are found in like manner." If all knot vectors are determined the T-spline can be calculated.

| s | N(s) | c | d |
|---|---|---|---|
| $[s_0, k, s_1, s_2, s_3, s_4]$ | $c_0 N[s_0, k, s_1, s_2, s_3](s) + d_0 N[k, s_1, s_2, s_3, s_4](s)$ | $c_0 = \frac{k - s_0}{s_3 - s_0}$ | 1 |
| $[s_0, s_1, k, s_2, s_3, s_4]$ | $c_1 N[s_0, s_1, k, s_2, s_3](s) + d_1 N[s_1, k, s_2, s_3, s_4](s)$ | $c_1 = \frac{k - s_0}{s_3 - s_0}$ | $d_1 = \frac{s_4 - k}{s_4 - s_1}$ |
| $[s_0, s_1, s_2, k, s_3, s_4]$ | $c_2 N[s_0, s_1, s_2, k, s_3](s) + d_2 N[s_1, s_2, k, s_3, s_4](s)$ | $c_2 = \frac{k - s_0}{s_3 - s_0}$ | $d_2 = \frac{s_4 - k}{s_4 - s_1}$ |
| $[s_0, s_1, s_2, s_3, k, s_4]$ | $c_3 N[s_0, s_1, s_2, s_3, k](s) + d_3 N[s_1, s_2, s_3, k, s_4](s)$ | 1 | $d_3 = \frac{s_4 - k}{s_4 - s_1}$ |

Knot Insertion-Local Refinement Algorithm

One major advantage of T-splines is the possibility to insert new control points at arbitrary positions in the T-mesh without the requirement to add a whole new row or column of control points. Sederberg et al. have developed a procedure containing rules and algorithms for successful knot insertion. The insertion process is done in two phases which are called topology and geometry phase. In the topology phase the control points which have to be inserted additionally are identified and in the geometry phase the new coordinates and weights for the new T-mesh are calculated.

Sederberg et al. states three possible violations which may occur during the insertion process and have to be corrected by inserting additional control points:

Violation 1: A blending function is missing a knot dictated by Rule 1 for the current T-mesh.

Violation 2: A blending function has a knot that is not dictated by Rule 1 for the current T-mesh.

Violation 3: A control point has no blending function associated with it. T. W. Sederberg, D. L. Cardon, G. T. Finnigan, N. S. North, J. Zheng and T. Lyche, T-spline Simplification and Local Refinement, *ACM Transactions on Graphics,* 23(3):276-283, August 2004, which is incorporated by reference herein in its entirety.

At first all control points are inserted at the position where more control is wanted. A grid check is done and additional points are inserted if a violation occurs. After solving all violations the new coordinates are calculated by linear transformation.

T-Splines in Evolutionary Optimization

One embodiment of the present invention provides for combination of the concept of T-splines and evolutionary optimization. As already pointed out above an adaptive behaviour of the representation is very important in terms of an optimization problem. One should try to keep the number of parameters as low as possible and to guarantee a wide variety of shape designs at the same time. T-splines offer a very good trade-off for this requirement in design optimization. Generally, the parameters are set to the control points of the T-mesh. So one can start with a quite low number of control points and in the course of the optimization control points can be added at any position to increase the resolution. So by application of this representation the high flexibility of T-splines can be used to position the control points directly where they are needed to achieve a maximum influence on the geometric shape while keeping the so-far best design. Because this will result in most cases to an addition of only a few control points the number of parameters is kept as low as possible. This affects the optimization in a very positive way.

According to one embodiment, due to the fact that the parameter of the transformation determines the degree of freedom for the modification the parameter can be set in a way that the necessary changes can be performed by the selected parameter. In case of any kind of optimization the "necessary changes" are not known beforehand and can only be based on experience. To generally increase the degree of freedom one could simply increase the number of control points in case of the free-form deformation. This would make the influence of the control points more local and global changes to the design would be more difficult to realize because various control points should be changed simultaneously. Furthermore there is a trade-off between freedom for the modification and the dimensionality of the optimization by changing the number of control points or the dimension of the matrix M in case of constrained deformations. This relation can also be observed representing curves or surfaces using splines.

The property of T-splines which is explained above is a reason for their development. By representing a surface by, for example, a NURBS surface spline the addition of a single control point requires the addition of a full row and or column of additional control points only to satisfy the constraints given by the representation. The same holds true when applying free form deformation methods which define the transformation of a design into another modified design.

Existing methods of free form deformations require defining a mesh of control points which then define the transformation function between designs. According to one embodiment of the present invention, an extension to this existing method of free form deformations is the automatic addition or removal of control points. This method allows modification of the transformation function during the optimization of a design. In case the given transformation functions does not provide a sufficiently high degree of freedom control points can be added to the existing set of control points. Due to this addition a higher degree of freedom exists in the transformation function and allows for more detailed deformations which can further improve the design concerning a given quality measure.

When introducing new control points in a spline (e.g. a surface spline) various methods exist to determine the optimal position of new control points in case of an approximation of a given surface. Local and global approximation methods exist in order to find the optimal position for new control points. These methods however are only applicable in case of the existence of a local quality measure. When this local quality measure does not exist the methods cannot be applied. This is for example the case for quality measures which are based on aerodynamic properties of the represented body. For example in case of the optimization of turbine blades very often the pressure loss is used as a quality measure. This pressure loss depends on the whole body of the design and it cannot be determined beforehand where additional control points have to be introduced.

According to one embodiment of the present invention, in this case the introduction of additional parameter of the transformation function can be realized by an additional mutation operator for the representation. Randomly control points are added in the spline which represents the transformation function. These modified representations then undergo the known process of evolution. Control points that are beneficial in the sense that they allow for positive variations of the transformation function can be selected during the process of evolution. According to one embodiment, the combination of the given method of free form deformation, methods for the introduction of control points and evolutionary computation provide an elegant way to adapt the transformation function used in free form deformations to the needs of the actual optimization.

Even if the described method of using spline functions as transformation functions which are modified by the explained method is an elegant way to increase the freedom of the optimization during the process to the special needs, the main drawback of the representation still exists. The introduction of a control point needs the introduction of several other control points only in order to fulfill the constraints of the representation.

As already explained according to one embodiment of the present invention, T-splines resolve this problem in case of the representation of surfaces. The use of T-splines instead of Nurbs splines allows for an introduction of single additional control points for that case.

In the same way, according to one embodiment of the present invention, for surface modeling the use of T-spline can solve the problem during control point addition for free form deformations. In the same way, according to one embodiment of the present invention, in the case of the extended free form deformation the introduction of new control points can be realized by an additional mutation operator. The additional mutation operator can modify the representation of the transformation instead of the parameter of the transformation in the same way. The mechanism which allows the selection of optimal positions for the introduction of additional control points is the same as already explained. The difference and the advantage is that the method according to one embodiment of the present invention allows local extension of the transformation function.

The following references are hereby incorporated be reference herein in their entirety: P. Borrel and A. Rappoport, Simple Constrained Deformations for Geometric Modeling and Interactive Design, *ACM Transactions on Graphics,* 13(2):137-155, Apr. 1994; S. Coquillart, Free-Form Deformation: A Sculpturing Tool for 3D Geometric Modeling, *Computer Graphics,* 24(4):187-196, Aug. 1990; Markus Olhofer, Yaochu Jin and Bernhard Sendhoff, Adaptive encoding for aerodynamic shape optimization using evolutionary strategies, *Congress on Evolutionary Computation (CEC),* IEEE Press, volume 2, pages 576-583, Seoul, Korea, May 2001; and L. Piegl and W. Tiller, The NURBS BOOK, Springer-Verlag Berlin Heidelberg, 1995, 1997.

The present invention may be embodied in various forms and should not be construed as limited to the embodiments set forth herein. Rather, these embodiments are provided so that disclosure will be thorough and complete and will fully convey the invention to those skilled in the art. Further, the apparatus and methods described are not limited to rigid bodies. While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without department from the spirit and scope of the invention as it is defined in the appended claims. Further, various embodiments of the present invention can be implemented as a computer program executing on a computer-readable medium.

What is claimed is:

1. A computer based method for optimizing a design using free form deformation, comprising:

determining a transformation function the free form deformation, using the computer, wherein the transformation function is defined by spline function that transforms a first space in which the design is defined into a second space in which a modified design is defined, wherein a parameter of the spline function determines a parameter of the transformation function; and modifying the design using the transformation function for the free form deformation, wherein the free form deformation is used as a representation for evolutionary computation;

wherein the parameter of the spline function defines a parameter of an evolutionary optimization algorithm;

wherein a mutation operator of the evolutionary computation acts directly on the representation of the design us the second space in order to introduce or delete control points of the spline function defining the transformation function transforming the spline;

wherein the introduction or deletion of control points of the spline function that defines the transformation function transforming the spline does not require altering a shape of the design.

2. The method of claim 1, wherein the evolutionary computation comprises at least one of:

an evolution strategy; and a genetic algorithm.

3. A computer program product embodied cm a computer readable medium which when executed by a computer performs the method steps of claim 1.

4. The method of claim 1, wherein the method starts with the lowest number of control points as possible.

5. A method according to claim 4, wherein the method stars with a number of control points equal to k+1, wherein k is the degree of the spline function.

6. The method of claim 5, wherein the introduction or deletion of control points of the spline function that defines the transformation function transforming the spline does not alter a shape of the design.

7. The method of claim 4, wherein the introduction or deletion of control points of the spline function that defines the transformation function transforming the spline does not alter a shape of the design.

8. The method of claim 5, wherein T splines are used.

* * * * *

UNITED STATES PATENT AND TRADEMARK OFFICE
CERTIFICATE OF CORRECTION

PATENT NO. : 7,609,262 B2
APPLICATION NO. : 11/302686
DATED : October 27, 2009
INVENTOR(S) : Markus Olhofer, Stefan Menzel and Bernhard Sendhoff It is certified that error appears in the above-identified patent and that said Letters Patent is hereby corrected as shown below:

Column 13, line 9, claim 1 after "function" insert --for--.

Column 13, line 11, claim 1 after "by" insert --a--.

Column 13, line 23, claim 1 delete "us" insert --in--.

Column 14, line 9, claim 1 delete "cm" insert --on--.

Column 14, line 14, claim 1 delete "stars" insert --starts--.

Signed and Sealed this

Nineteenth Day of January, 2010

David J. Kappos
*Director of the United States Patent and Trademark Office*